United States Patent
Lin

(10) Patent No.: US 11,435,891 B2
(45) Date of Patent: Sep. 6, 2022

(54) AUGMENT REALITY TECHNIQUES FOR CONTROLLING SMART DEVICES

(71) Applicant: BEIJING XIAOMI MOBILE SOFTWARE CO., LTD., Beijing (CN)

(72) Inventor: Xingsheng Lin, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/328,472

(22) Filed: May 24, 2021

(65) Prior Publication Data

US 2022/0083188 A1 Mar. 17, 2022

(30) Foreign Application Priority Data

Sep. 17, 2020 (CN) .......................... 202010981293.1

(51) Int. Cl.
*G06F 3/0487* (2013.01)
*G06T 11/00* (2006.01)
*G06T 7/73* (2017.01)
*G06V 20/00* (2022.01)
*G06F 3/0482* (2013.01)

(52) U.S. Cl.
CPC .............. *G06F 3/0487* (2013.01); *G06T 7/73* (2017.01); *G06T 11/00* (2013.01); *G06V 20/00* (2022.01); *G06F 3/0482* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 10,834,562 B1* | 11/2020 | Zalewski | H04B 1/3833 |
| 2018/0157398 A1 | 6/2018 | Kaehler et al. | |
| 2018/0218538 A1* | 8/2018 | Short | G02B 27/017 |
| 2019/0114061 A1* | 4/2019 | Daniels | G06F 3/048 |
| 2019/0171170 A1* | 6/2019 | Becea | G05B 19/042 |
| 2020/0393952 A1* | 12/2020 | Hsiao | G06F 3/04815 |

FOREIGN PATENT DOCUMENTS

EP 3495926 A1 6/2019

OTHER PUBLICATIONS

European Patent Application No. 21175911.3, Extended Search and Opinion dated Nov. 24, 2021, 12 pages.

* cited by examiner

*Primary Examiner* — Edward Martello
(74) *Attorney, Agent, or Firm* — Lathrop GPM LLP

(57) ABSTRACT

The present disclosure relates to a device control method and apparatus, and a storage medium. The method includes: acquiring an AR anchor in an image captured by the camera, in which the AR anchor is created in advance according to a spatial location of a target device; determining the target device bound to the spatial location anchored by the AR anchor; displaying a control menu of the target device; generating a control instruction in response to an operation on the control menu, and controlling the target device according to the control instruction.

20 Claims, 7 Drawing Sheets

AUGMENT REALITY TECHNIQUES FOR CONTROLLING SMART DEVICES

CROSS-REFERENCE TO RELATED APPLICATION

The present application is based upon and claims priority to Chinese Patent Application No. 202010981293.1, filed on Sep. 17, 2020, the entirety contents of which are incorporated herein by reference.

TECHNICAL FIELD

The disclosure relates to the field of smart device control, and more particularly, to a device control method and apparatus, and a storage medium.

BACKGROUND

With the continuous popularization of smart devices, traditional hardware switches, control panels, and remote controls cannot satisfy users' efficient control of smart devices.

In related technologies, there are two control methods for smart devices. The first is to find the control menu of the corresponding device through the mobile phone APP to control the smart device; the second is to identify the device image, acquire the device type and determine the control menu of the device, so as to control the device.

SUMMARY

The disclosure provides a device control method and apparatus, and a storage medium.

According to embodiments of the disclosure, a device control method is provided. The method is applied to a terminal provided with a camera and includes: acquiring an AR anchor in an image captured by the camera, in which the AR anchor is created in advance according to a spatial location of a target device; determining the target device bound to the spatial location anchored by the AR anchor; displaying a control menu of the target device; and generating a control instruction in response to an operation on the control menu, and controlling the target device according to the control instruction.

According to embodiments of the present disclosure, a device control apparatus is provided. The apparatus is applied to a terminal provided with a camera and includes: one or more processors, a memory storing instructions executable by the one or more processors, in which the one or more processors are configured to: acquire an AR anchor in an image captured by the camera, in which the AR anchor is created in advance according to a spatial location of a target device; determine the target device bound to the spatial location anchored by the AR anchor; display a control menu of the target device; generate a control instruction in response to an operation on the control menu, and control the target device according to the control instruction.

According to embodiments of the present disclosure, a non-transitory computer-readable storage medium is provided. The storage medium has stored therein instructions that, when executed by a processor, causes the processor to perform the method as described above. The method includes: acquiring an AR anchor in an image captured by the camera, in which the AR anchor is created in advance according to a spatial location of a target device; determining the target device bound to the spatial location anchored by the AR anchor; displaying a control menu of the target device; and generating a control instruction in response to an operation on the control menu, and controlling the target device according to the control instruction.

The technical solution provided by the embodiments of the present disclosure may include the following beneficial effects. With the present disclosure, an AR anchor in an image is acquired, the target device bound to the spatial location anchored by the AR anchor is determined according to the AR anchor, a control menu of the target device is displayed, and the target device is controlled through the control menu. Therefore, the control menu of the target device may be acquired at any angle or location in the space where the target device is located, and each device corresponds to an anchor, and in a case that there are multiple devices, the control menu of the target device may be acquired accurately to control the target device.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

With the continuous popularization of smart devices, traditional hardware switches, control panels, and remote controls cannot satisfy users' efficient control of smart devices.

In related technologies, there are two control methods for smart devices. The first one is to find the corresponding device to be controlled through the mobile phone APP, and click to get the control menu of the device for operation, so as to realize the control of the smart device. This method requires users to search one by one when there are many devices, which is inefficient; when there are many devices of the same type, it is impossible to determine a specific device that needs to be controlled.

The second control method is to identify the device to be controlled by identifying the device image, acquire the device type and determine the control menu of the device to control the device. This method is affected by the shooting angle of the device image. In the case of incomplete device identification information in the device image, it is impossible to determine the device to be controlled, and because some devices have similar identification or less feature information, it is impossible to efficiently control the device.

A device control method and apparatus, and a storage medium are provided by the present disclosure, which can overcome the technical problems of low device control efficiency in the related art and the inability to efficiently control the device under the influence of the shooting angle of the device image.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
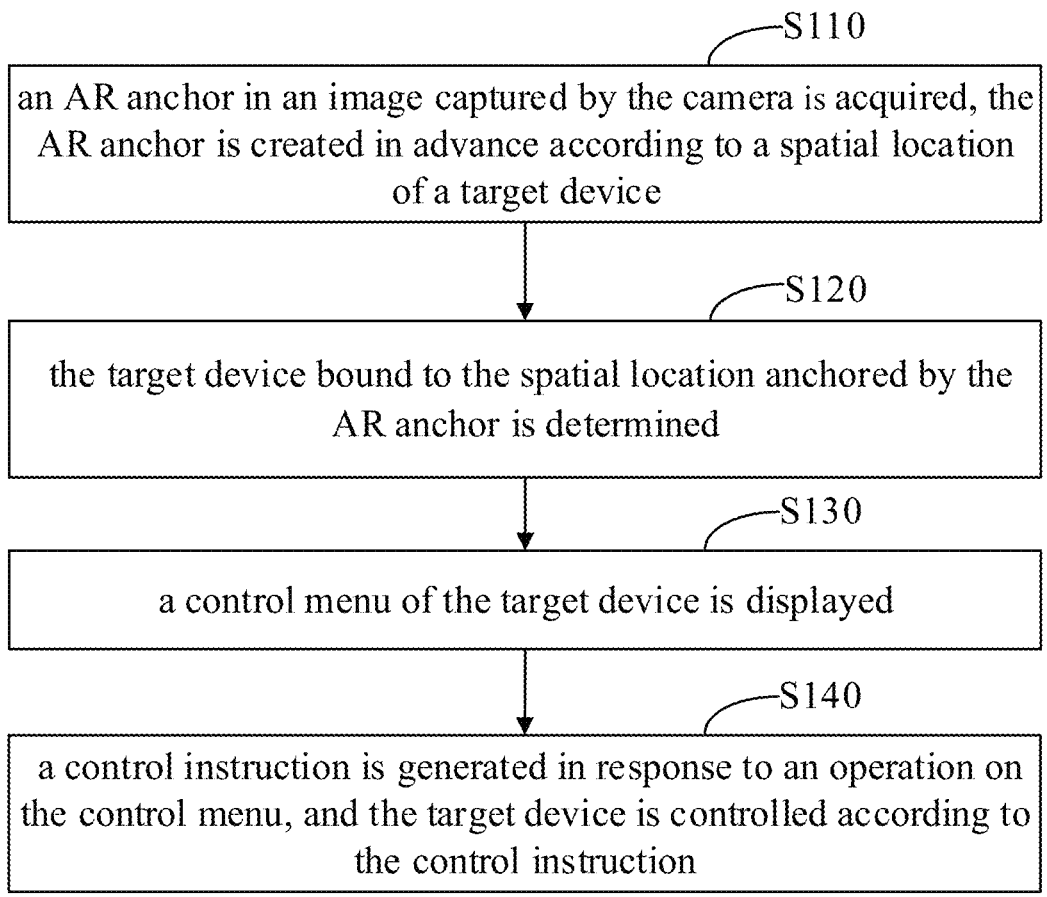
FIG. 1 is a flowchart showing a device control method according to an exemplary embodiment.

FIG. 1 is a flowchart of a device control method according to an exemplary embodiment. As shown in FIG. 1, the device control method is used in a terminal equipped with a camera. The terminal may be a mobile phone, a tablet, etc., and includes the following steps.

In step S110, an AR anchor in an image captured by the camera is acquired, the AR anchor is created in advance according to a spatial location of a target device.

In step S120, the target device bound to the spatial location anchored by the AR anchor is determined.

In step S130, a control menu of the target device is displayed.

In step S140, a control instruction is generated in response to an operation on the control menu, and the target device is controlled according to the control instruction.

The control menu of the target device may be displayed in a preview interface (i.e., an image viewfinder frame) of the terminal, which is not specifically limited in the present disclosure.

Specifically, the target device in this embodiment may be terminal hardware devices with smart capabilities such as smart lights, door locks, air conditioners, and air purifiers.

For example, the AR anchor in the image captured by the camera is acquired, the target device bound to the spatial location anchored by the AR anchor is determined, a control menu of the target device is displayed to the user, and a control instruction is generated in response to an operation on the control menu, and the target device is controlled according to the control instruction.

Optionally, the AR anchor can be created in the following manners: acquiring the spatial location of the target device through the camera, and acquiring a display location of the image of the target device in a preview interface of the terminal; creating the AR anchor corresponding to the target device according to the spatial location and the display location; generating anchor identification information according to the AR anchor, binding the anchor identification information and device identification information to acquire a binding relationship, and sending the binding relationship to a server for storage, in which the server stores a corresponding relationship between the device identification information of the target device and a control menu of the target device.

The spatial location of the target device may be a position of the target device in a physical space, and the display location of the target device may be a position of the target device in the virtual space where the anchor is established, which is not specifically limited in the present disclosure.

The preview interface of the terminal can be preset according to the user's usage habits, which is not specifically limited in the present disclosure.

For example, the device in the preview interface of the terminal is determined as the target device that needs to create an AR anchor, the display location of the device and the spatial location of the device is acquired through the camera, and the AR anchor corresponding to the device is created according to the display location and spatial location, anchor identification information is generated according to the AR anchor, the anchor identification information of the AR anchor and the device identification information of the device may be bond to achieve the binding between the AR anchor and the device; the binding relationship is sent to a server for storage, in which the server stores a corresponding relationship between the device identification information of the target device and a control menu of the target device, so that the control menu of the device is determined according to the AR anchor, and the device is controlled through the control menu.

Optionally, acquiring the spatial location of the target device through the camera includes: performing spatial feature recognition through the camera to acquire a plurality of spatial feature points; and creating the AR anchor corresponding to the target device according to the spatial location and the display location includes: creating the AR anchor according to a positional relationship between a target display location and the plurality of spatial feature points.

For example, the camera is used to perform spatial feature recognition to acquire multiple spatial feature points, the position of the device relative to the space is determined according to the display location and the positional relationship among the multiple spatial feature points, and an AR anchor is created at the device relative to the space. After the AR anchor is created, if the location of the device is not moved, the location of the device in the current space can also be acquired according to the AR anchor. For example, the spatial feature recognition is performed on a living room through the camera to acquire multiple spatial feature points. The spatial feature points include but are not limited to windows, doors, and TV walls in the living room that characterize the distribution characteristics of the living room. An air conditioner is placed in the living room, the air conditioner is placed on the floor of the living room. The air conditioner is determined to be placed on the ground next to the window of the living room according to the position relationship between the location of the air conditioner and the spatial feature points of the living room, and the AR anchor is created on the ground next to the window of the living room where the air conditioner is located.

Figure 2:
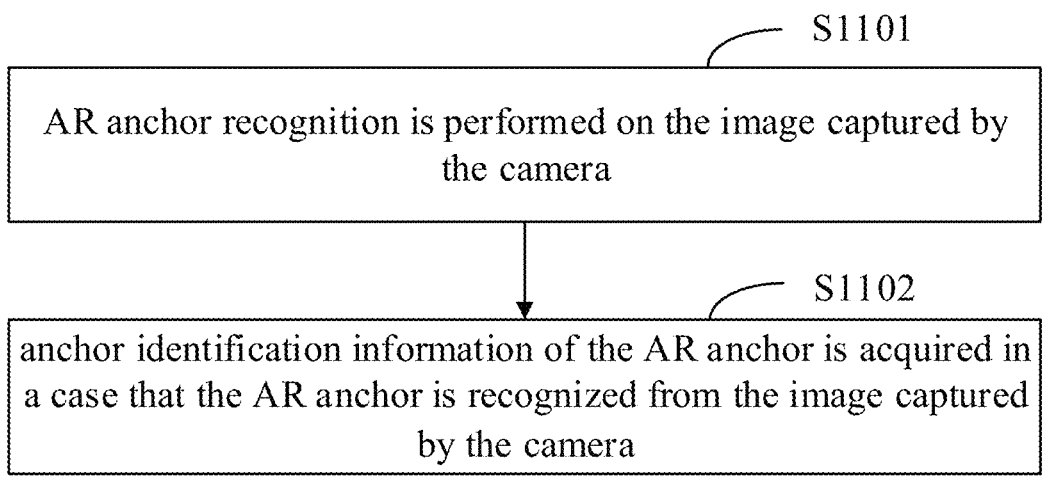
FIG. 2 is a flowchart showing optional steps of a device control method according to an exemplary embodiment.

Optionally, as shown in FIG. 2, step S110 may include followings.

In step S1101, AR anchor recognition is performed on the image captured by the camera.

In step S1102, anchor identification information of the AR anchor is acquired in a case that the AR anchor is recognized from the image captured by the camera.

Determining the target device bound to the spatial location anchored by the AR anchor may include: determining the target device bound to the spatial location anchored by the AR anchor according to the anchor identification information of the AR anchor, and a corresponding relationship between pre-stored anchor identification information and target device identification information.

For example, the terminal's camera captures an image of the current space, the terminal recognizes the AR anchor in the image, and when the AR anchor is recognized from the image, the anchor identification information of the AR anchor is acquired. The target device bound to the spatial location anchored by the AR anchor is determined according to the anchor identification information of the AR anchor, and a corresponding relationship between pre-stored anchor identification information and target device identification information. For example, the image of the living room is captured by the camera, and the AR anchor in the image is recognized. When the AR anchor is recognized from the image, the anchor identification information of the AR anchor is acquired; the air conditioner bound to the spatial location anchored by the AR anchor is determined according to the anchor identification information of the AR anchor, and a corresponding relationship between pre-stored anchor identification information and target device identification information.

Optionally, displaying the control menu of the target device includes: displaying the control menu of the target device within a preset range of the position according to a location of the AR anchor in the image; or, displaying the control menu of the target device corresponding to the AR anchor closest to a user according to a distance of each AR anchor relative to the user in a case that there are a plurality of AR anchors.

Figure 3:
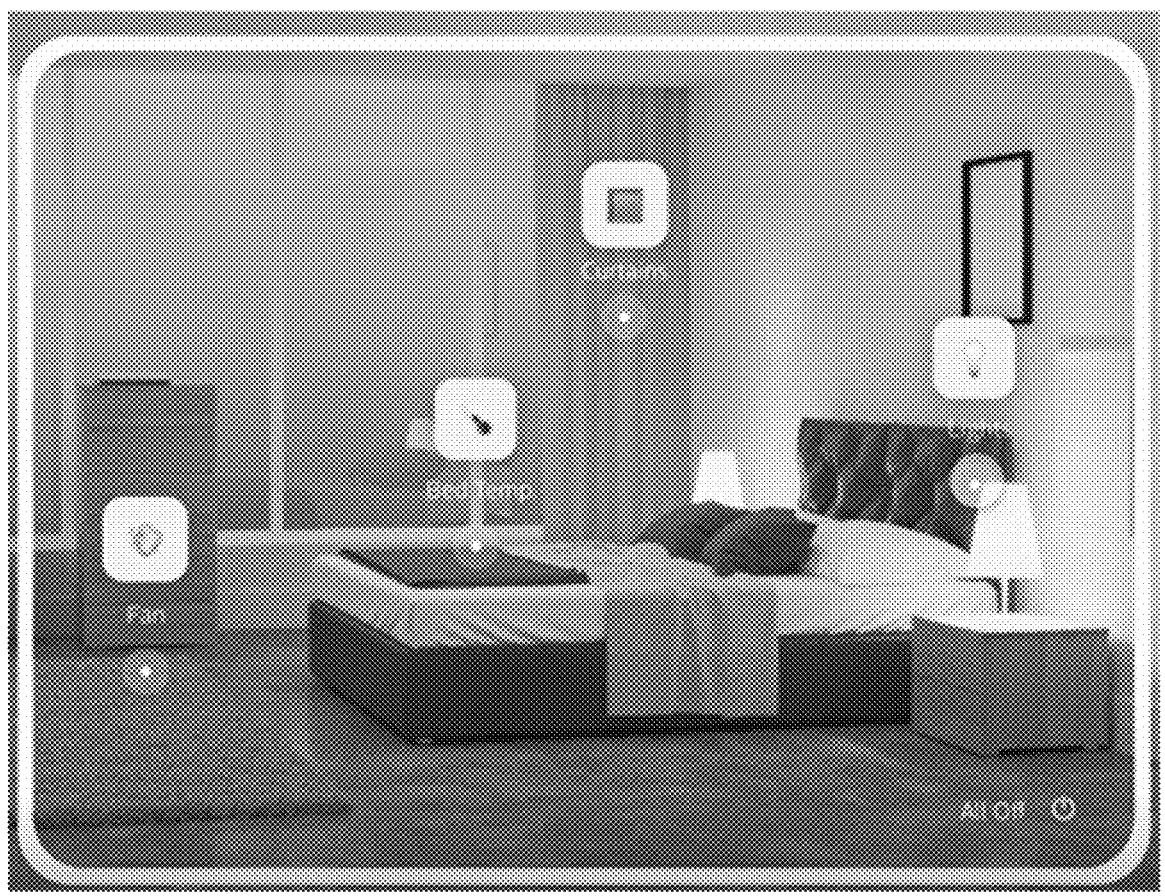
FIG. 3 is a schematic diagram showing a control menu of a target device according to an exemplary embodiment.

Specifically, as shown in FIG. 3, in the case that multiple AR anchors of curtains (Curtains), lights (Lights), bed temperature (Bed Temp), and fans (Fan) are included in the captured image, according to the locations of the respective AR anchors in the image, the control menus of curtains, lights, bed temperature, and fans within the preset range of the location is displayed. The user can select the control menus as needed, so as to control one of the curtain, the light, the bed temperature, and the fan. The captured image can include one AR anchor of the curtain, or it can include multiple AR anchors of the curtain, light, bed temperature, and fan at the same time, which will not be limited in the present disclosure.

Figure 4:
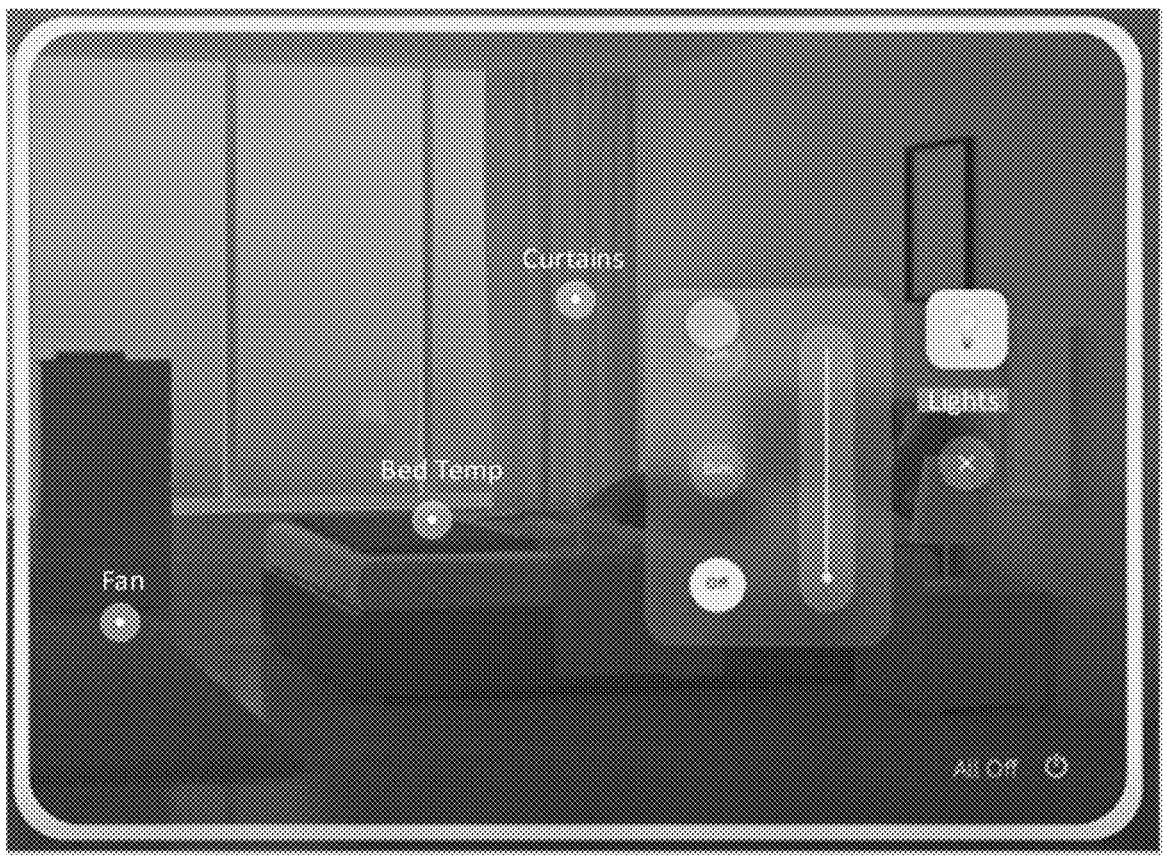
FIG. 4 is a schematic diagram showing a control menu of a target device according to another exemplary embodiment.

As shown in FIG. 4, in the case that multiple AR anchors of curtains, lights, bed temperature, and fans are included in the captured image, the control menu of the target device corresponding to the AR anchor closest to a user may be displayed according to a distance of each AR anchor relative to the user. The user controls the light according to the control menu of the light, and this will not be limited in the present disclosure.

When the control menus of multiple target devices are displayed, the function of turning off all the devices in the image with one key can also be realized through the master switch (All Off), all devices can also be turned on at the same time when the user needs to go out immediately, which will not be limited in the present disclosure.

One anchor identification information corresponds to one device identification information.

Figure 5:
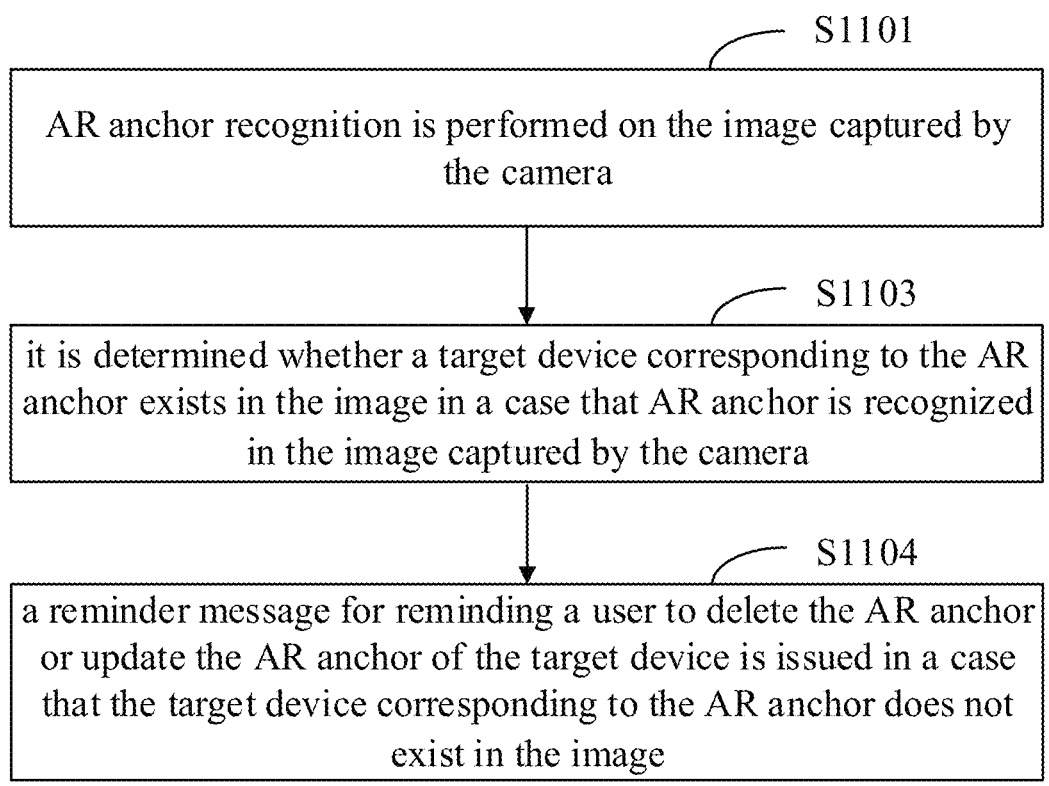
FIG. 5 is a flowchart showing optional steps of a device control method according to another exemplary embodiment.

Optionally, as shown in FIG. 5, step S110 may include followings.

In step S1101, AR recognition is performed in the image captured by the camera.

In step S1103, it is determined whether a target device corresponding to the AR anchor exists in the image in a case that AR anchor is recognized in the image captured by the camera.

In step S1104, a reminder message for reminding a user to delete the AR anchor or update the AR anchor of the target device is issued in a case that the target device corresponding to the AR anchor does not exist in the image.

Specifically, the reminder message may be a text message or a voice message, which is not specifically limited in the present disclosure.

For example, when an AR anchor is recognized in the image of the living room captured by the camera, it is determined whether there is an air conditioner corresponding to the AR anchor in the image; when the air conditioner is moved out of the living room and placed in the bedroom, the captured image of the living room does not include the air conditioner, a reminder message to remind the user to delete the AR anchor is issued; when the air conditioner is moved from a place to another place in the living room, the captured image of the living room does not include the air conditioner, a reminder message to remind the user to update the AR anchor of the air conditioner is issued.

Figure 6:
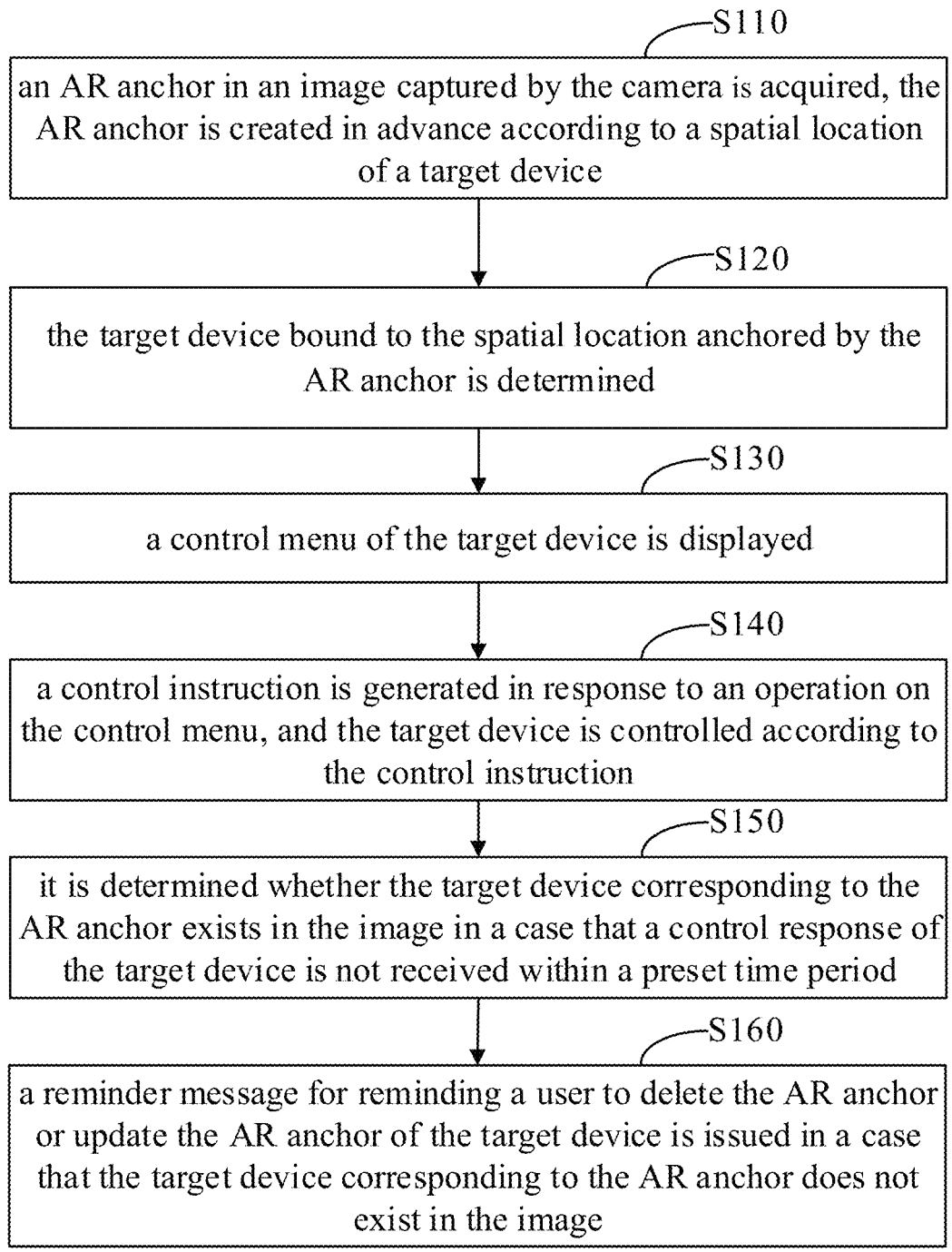
FIG. 6 is a flowchart showing a device control method according to another exemplary embodiment.

Optionally, as shown in FIG. 6, the device control method disclosed in this embodiment may further include the following steps.

In step S110, an AR anchor in an image captured by the camera is acquired, in which the AR anchor is created in advance according to a spatial location of a target device.

In step S120, a target device bound to the spatial location anchored by the AR anchor is determined.

In step S130, the control menu of the target device is displayed.

In step S140, a control instruction is generated in response to an operation on the control menu, and the target device is controlled according to the control instruction.

In step S150, it is determined whether the target device corresponding to the AR anchor exists in the image in a case that a control response of the target device is not received within a preset time period.

In step S160, a reminder message for reminding a user to delete the AR anchor or update the AR anchor of the target device is issued in a case that the target device corresponding to the AR anchor does not exist in the image.

The preset time period can be preset according to an actual response of the target device, which is not specifically limited in the present disclosure.

For example, after the air conditioner is damaged and discarded or given to others, the AR anchor in the image captured by the camera is acquired, the target device bound to the spatial location anchored by the AR anchor is determined, and the control menu of the target device is displayed to the user. In response to the user's operation on the control menu, a control instruction is generated, and the air conditioner (target device) is controlled according to the control instruction, and if the control response of the air conditioner is not received within 5 minutes, it is determined whether there is an air conditioner corresponding to the AR anchor in the image of the living room, and if the air conditioner corresponding to the AR anchor is not stored in the image, a reminder message to remind the user to delete the AR anchor is issued.

After moving the air conditioner from the living room to the study room, the AR anchor in the image captured by the camera is acquired. The target device bound to the spatial location of the AR anchor is determined, and the control menu of the target device is displayed to the user. A control instruction is generated in response to the user's operation on the control menu, and the air conditioner (target device) is controlled according to the control instruction. If the control response of the air conditioner is not received within 5 minutes, it is determined whether there is an air conditioner corresponding to the AR anchor in the image of the living room, and if the air conditioner corresponding to the AR anchor is not stored in the image, a reminder message to remind the user to update the AR anchor of the air conditioner is issued.

Optionally, the controlling the target device according to the control instruction may include: sending the control instruction to a server, so that the server controls the target device corresponding to the device identification information according to the control instruction.

The device control method disclosed in this embodiment can acquire the AR anchor in the image captured by the camera at any angle and position in the space where the device is located, determine the target device anchored by the AR anchor, display the control menu of the target device, and control the target device through the control menu. Each device corresponds to an anchor. In the case of multiple devices existing in the image, the control menu of each device can be quickly and accurately acquired through the AR anchor to efficiently control the device without being affected by the angle of the image taken by the camera.

Figure 7:
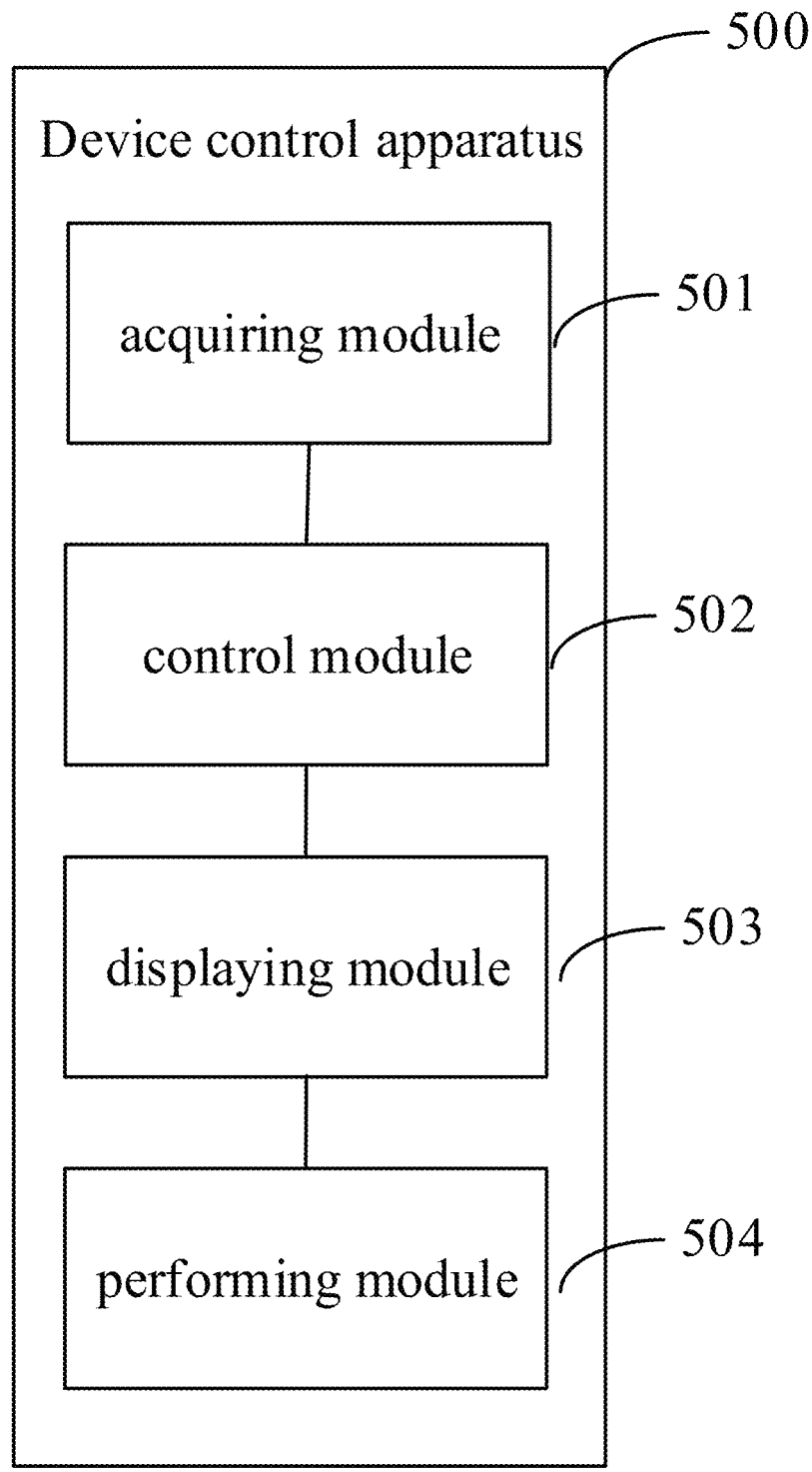
FIG. 7 is a block diagram showing a device control apparatus according to an exemplary embodiment.

FIG. 7 is a block diagram showing a device control apparatus according to an exemplary embodiment. Referring to FIG. 7, the apparatus 500 includes: an acquiring module 501, a control module 502, a displaying module 503, and a performing module 504.

The device control apparatus disclosed in this embodiment can acquire the AR anchor in the image captured by the camera at any angle and position in the space where the device is located, determine the target device anchored by the AR anchor, display the control menu of the target device, and control the target device through the control menu. Each device corresponds to an anchor. In the case of multiple devices existing in the image, the control menu of each device can be quickly and accurately acquired through the AR anchor to efficiently control the device without being affected by the angle of the image taken by the camera.

The acquiring module 501 is configured to acquire an AR anchor in an image captured by the camera, in which the AR anchor is created in advance according to a spatial location of a target device.

The control module 502 is configured to determine the target device bound to the spatial location anchored by the AR anchor.

The displaying module 503 is configured to display a control menu of the target device.

The performing module 504 is configured to generate a control instruction in response to an operation on the control menu, and control the target device according to the control instruction.

Optionally, the acquiring module 501 is configured to: perform AR anchor recognition on the image captured by the camera; acquire anchor identification information of the AR anchor in a case that the AR anchor is recognized from the image captured by the camera; determine the target device bound to the spatial location anchored by the AR anchor according to the anchor identification information of the AR anchor, and a corresponding relationship between pre-stored anchor identification information and target device identification information.

Optionally, the performing module 504 is configured to: determine whether the target device corresponding to the AR anchor exists in the image in a case that a control response of the target device is not received within a preset time period; issue a reminder message for reminding a user to delete the AR anchor or update the AR anchor of the target device in a case that the target device corresponding to the AR anchor does not exist in the image.

Optionally, the performing module 504 is also configured to send the control instruction to a server, such that the server may control the target device according to the control instruction.

Optionally, the apparatus 500 includes a judging module, which is configured to determine whether a target device corresponding to the AR anchor exists in the image; and to issue a reminder message for reminding a user to delete the AR anchor or update the AR anchor of the target device in a case that the target device corresponding to the AR anchor does not exist in the image.

Optionally, the apparatus 500 includes an anchor creating module, configured to: acquire the spatial location of the target device through the camera, and acquire a display location of the image of the target device in a preview interface of the terminal; create the AR anchor corresponding to the target device according to the spatial location and the display location; and generate anchor identification information according to the AR anchor, bind the anchor identification information and device identification information to acquire a binding relationship, and send the binding relationship to a server for storage, wherein the server stores a corresponding relationship between the device identification information of the target device and a control menu of the target device.

Optionally, the anchor creating module is configured to: perform spatial feature recognition through the camera to acquire a plurality of spatial feature points; create the AR anchor according to a positional relationship between a target display location and the plurality of spatial feature points.

Optionally, the displaying module comprises a first displaying sub-module and a second displaying sub-module, the first displaying sub-module is configured to display the control menu of the target device within a preset range of the position according to a location of the AR anchor in the image; the second displaying sub-module is configured to display the control menu of the target device corresponding to the AR anchor closest to a user according to a distance of each AR anchor relative to the user in a case that there are a plurality of AR anchors.

Regarding the apparatus in the above embodiments, the detail manner of operations of the respective modules are described in detail in the method embodiments, which will not be described in detail herein.

A non-transitory computer-readable storage medium is provided in embodiments of the present disclosure, the storage medium has stored therein instructions that, when executed by a processor, causes the processor to perform the method provided in embodiments of the present disclosure.

Specifically, the computer-readable storage medium may be flash memory, hard disk, multimedia card, card-type memory (for example, SD or DX memory, etc.), random access memory (RAM), static random access memory (SRAM), read-only memory (ROM), electrically erasable programmable read-only memory (EEPROM), programmable read-only memory (PROM), magnetic storage, magnetic disks, optical disks, servers, etc.

Regarding the computer-readable storage medium in the foregoing embodiment, the method steps performed when the computer program stored thereon is executed have been described in detail in the embodiment of the method, and will not be elaborated here.

The present disclosure also provides a device control apparatus, which may be a computer, a platform device, etc., and the device control apparatus includes: a processor; and a memory for storing instructions executable by the processor; in which the processor is configured to: acquire an AR anchor in an image captured by the camera, wherein the AR anchor is created in advance according to a spatial location of a target device; determine the target device bound to the spatial location anchored by the AR anchor; display a control menu of the target device; generate a control instruction in response to an operation on the control menu, and controlling the target device according to the control instruction.

The device control apparatus disclosed in this embodiment can acquire the AR anchor in the image captured by the camera at any angle and position in the space where the device is located, determine the target device anchored by the AR anchor, display the control menu of the target device, and control the target device through the control menu. Each device corresponds to an anchor. In the case of multiple devices existing in the image, the control menu of each device can be quickly and accurately acquired through the AR anchor to efficiently control the device without being affected by the angle of the image taken by the camera.

Figure 8:
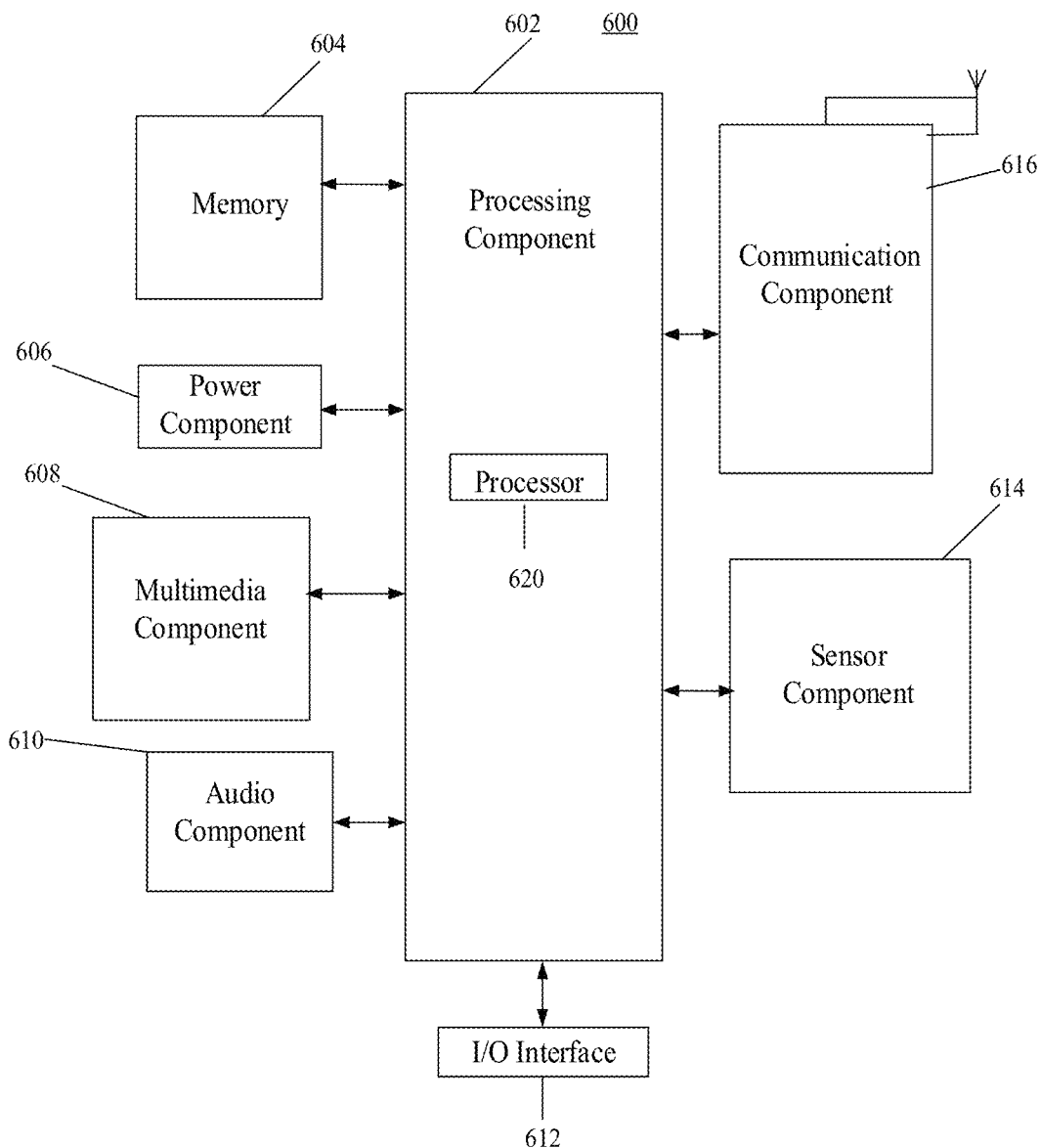
FIG. 8 is a block diagram showing a device control apparatus according to an exemplary embodiment.

FIG. 8 is a block diagram showing a device control apparatus 600 according to an exemplary embodiment. The apparatus 600 may be, for example, a mobile phone, a computer, a tablet device etc.

Referring to FIG. 8, the terminal 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the terminal 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the terminal 600. Examples of such data include instructions for any applications or methods operated on the terminal 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the terminal 600. The power component 606 may include a power management system, one or more power sources, and any other components associated with the generation, management, and distribution of power in the terminal 600.

The multimedia component 608 includes a screen providing an output interface between the terminal 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive an external multimedia datum while the terminal 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone ("MIC") configured to send an voice message to remind the user to delete or update the AR anchor of the target device when the apparatus 600 is in an operation mode such as controlling the target device.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the terminal 600. For instance, the sensor component 614 may detect an open/closed status of the terminal 600, relative positioning of components, e.g., the display and the keypad, of the terminal 600, a change in position of the terminal 600 or a component of the terminal 600, a presence or absence of user contact with the terminal 600, an orientation or an acceleration/deceleration of the terminal 600, and a change in temperature of the terminal 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the terminal 600 and other devices. The terminal 600 can access a wireless network based on a communication standard, such as WiFi, 2G, or 3G, or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 604, executable by the processor 620 in the terminal 600, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A device control method, applied to a terminal provided with a camera, comprising:
   acquiring an AR anchor in an image captured by the camera, wherein the AR anchor is created in advance according to a spatial location of a target device by: acquiring multiple spatial feature points via the camera, determining the spatial location of the target device according to a display location and a positional relationship among the multiple spatial feature points;
   determining the target device bound to the spatial location anchored by the AR anchor;
   displaying a control menu of the target device;
   generating a control instruction in response to an operation on the control menu, and controlling the target device according to the control instruction.

2. The method of claim 1, wherein the acquiring an AR anchor in the image captured by the camera comprises:
   performing AR anchor recognition on the image captured by the camera;
   acquiring anchor identification information of the AR anchor in a case that the AR anchor is recognized from the image captured by the camera;
   wherein determining the target device bound to the spatial location anchored by the AR anchor comprises:
   determining the target device bound to the spatial location anchored by the AR anchor according to the anchor identification information of the AR anchor, and a corresponding relationship between pre-stored anchor identification information and target device identification information.

3. The method of claim 2, wherein, in a case that the AR anchor is recognized from the image captured by the camera, the method further comprises:
   determining whether the target device corresponding to the AR anchor exists in the image;
   issuing a reminder message for reminding a user to delete the AR anchor or update the AR anchor of the target device in a case that the target device corresponding to the AR anchor does not exist in the image.

4. The method of claim 2, wherein after controlling the target device according to the control instruction, the method comprises:
   determining whether the target device corresponding to the AR anchor exists in the image in a case that a control response of the target device is not received within a preset time period;
   issuing a reminder message for reminding a user to delete the AR anchor or update the AR anchor of the target device in a case that the target device corresponding to the AR anchor does not exist in the image.

5. The method of claim 1, wherein the AR anchor is created by:
   acquiring the spatial location of the target device through the camera, and acquiring a display location of the image of the target device in a preview interface of the terminal;
   creating the AR anchor corresponding to the target device according to the spatial location and the display location;
   generating anchor identification information according to the AR anchor, binding the anchor identification information and device identification information to acquire a binding relationship, and sending the binding relationship to a server for storage, wherein the server stores a corresponding relationship between the device identification information of the target device and a control menu of the target device.

6. The method of claim 5, wherein acquiring the spatial location of the target device through the camera comprises:
   performing spatial feature recognition through the camera to acquire of the multiple spatial feature points;
   wherein creating the AR anchor corresponding to the target device according to the spatial location and the display location comprises:
   creating the AR anchor according to a positional relationship between a target display location and the multiple spatial feature points.

7. The method of claim 1, wherein displaying the control menu of the target device comprises at least one of:
   displaying the control menu of the target device within a preset range of the position according to a location of the AR anchor in the image; and
   displaying the control menu of the target device corresponding to the AR anchor closest to a user according to a distance of each AR anchor relative to the user in a case that there are a plurality of AR anchors.

8. A device control apparatus, applied to a terminal provided with a camera, comprising:
   one or more processors;
   a memory storing instructions executable by the one or more processors;
   wherein the one or more processors are configured to:
   acquire an AR anchor in an image captured by the camera, wherein the AR anchor is created in advance according to a spatial location of a target device by: acquiring multiple spatial feature points via the camera, determining the spatial location of the target device according to a display location and a positional relationship among the multiple spatial feature points;
   determine the target device bound to the spatial location anchored by the AR anchor;
   display a control menu of the target device;
   generate a control instruction in response to an operation on the control menu, and control the target device according to the control instruction.

9. The apparatus of claim 8, wherein the one or more processors are configured to:
perform AR anchor recognition on the image captured by the camera;
acquire anchor identification information of the AR anchor in a case that the AR anchor is recognized from the image captured by the camera;
determine the target device bound to the spatial location anchored by the AR anchor according to the anchor identification information of the AR anchor, and a corresponding relationship between pre-stored anchor identification information and target device identification information.

10. The apparatus of claim 8, wherein the one or more processors are configured to:
determine whether a target device corresponding to the AR anchor exists in the image; and
to issue a reminder message for reminding a user to delete the AR anchor or update the AR anchor of the target device in a case that the target device corresponding to the AR anchor does not exist in the image.

11. The apparatus of claim 8, wherein the one or more processors are configured to:
determine whether the target device corresponding to the AR anchor exists in the image in a case that a control response of the target device is not received within a preset time period;
issue a reminder message for reminding a user to delete the AR anchor or update the AR anchor of the target device in a case that the target device corresponding to the AR anchor does not exist in the image.

12. The apparatus of claim 8, wherein the one or more processors are configured to:
acquire the spatial location of the target device through the camera, and acquire a display location of the image of the target device in a preview interface of the terminal; create the AR anchor corresponding to the target device according to the spatial location and the display location; and generate anchor identification information according to the AR anchor, bind the anchor identification information and device identification information to acquire a binding relationship, and send the binding relationship to a server for storage, wherein the server stores a corresponding relationship between the device identification information of the target device and a control menu of the target device.

13. The apparatus of claim 12, wherein the one or more processors are configured to:
perform spatial feature recognition through the camera to acquire the multiple spatial feature points;
create the AR anchor according to a positional relationship between a target display location and the multiple spatial feature points.

14. The apparatus of claim 8, wherein the one or more processors are configured to:
display the control menu of the target device within a preset range of the position according to a location of the AR anchor in the image; and/or
display the control menu of the target device corresponding to the AR anchor closest to a user according to a distance of each AR anchor relative to the user in a case that there are a plurality of AR anchors.

15. A non-transitory computer-readable storage medium having stored therein instructions that, when executed by a processor, causes the processor to perform a device control method, wherein the method is applied to a terminal provided with a camera and comprises:
acquiring an AR anchor in an image captured by the camera, wherein the AR anchor is created in advance according to a spatial location of a target device by: acquiring multiple spatial feature points via the camera, determining the spatial location of the target device according to a display location and a positional relationship among the multiple spatial feature points;
determining the target device bound to the spatial location anchored by the AR anchor;
displaying a control menu of the target device;
generating a control instruction in response to an operation on the control menu, and controlling the target device according to the control instruction.

16. The non-transitory computer-readable storage medium of claim 15, wherein the acquiring an AR anchor in the image captured by the camera comprises:
performing AR anchor recognition on the image captured by the camera;
acquiring anchor identification information of the AR anchor in a case that the AR anchor is recognized from the image captured by the camera;
wherein determining the target device bound to the spatial location anchored by the AR anchor comprises:
determining the target device bound to the spatial location anchored by the AR anchor according to the anchor identification information of the AR anchor, and a corresponding relationship between pre-stored anchor identification information and target device identification information.

17. The non-transitory computer-readable storage medium of claim 16, wherein, in a case that the AR anchor is recognized from the image captured by the camera, the method further comprises:
determining whether a target device corresponding to the AR anchor exists in the image;
issuing a reminder message for reminding a user to delete the AR anchor or update the AR anchor of the target device in a case that the target device corresponding to the AR anchor does not exist in the image.

18. The non-transitory computer-readable storage medium of claim 16, wherein after controlling the target device according to the control instruction, the method comprises:
determining whether the target device corresponding to the AR anchor exists in the image in a case that a control response of the target device is not received within a preset time period;
issuing a reminder message for reminding a user to delete the AR anchor or update the AR anchor of the target device in a case that the target device corresponding to the AR anchor does not exist in the image.

19. The non-transitory computer-readable storage medium of claim 15, wherein the AR anchor is created by:
acquiring the spatial location of the target device through the camera, and acquiring a display location of the image of the target device in a preview interface of the terminal;
creating the AR anchor corresponding to the target device according to the spatial location and the display location;
generating anchor identification information according to the AR anchor, binding the anchor identification information and device identification information to acquire a binding relationship, and sending the binding relationship to a server for storage, wherein the server stores a corresponding relationship between the device identification information of the target device and a control menu of the target device.

20. The non-transitory computer-readable storage medium of claim 19, wherein acquiring the spatial location of the target device through the camera comprises:
performing spatial feature recognition through the camera to acquire of the multiple spatial feature points;
wherein creating the AR anchor corresponding to the target device according to the spatial location and the display location comprises:
creating the AR anchor according to a positional relationship between a target display location and the multiple spatial feature points.

* * * * *